United States Patent
Matsuoka et al.

(10) Patent No.: US 10,493,893 B2
(45) Date of Patent: Dec. 3, 2019

(54) ELECTRICALLY-DRIVEN VEHICLE

(71) Applicant: Toyota Jidosha Kabushiki Kaisha, Toyota-shi, Aichi-ken (JP)

(72) Inventors: Tomohito Matsuoka, Nagoya (JP); Seiichi Tsunoda, Nisshin (JP); Jiro Goto, Seto (JP); Masayuki Yamada, Chofu (JP); Yasutaka Eto, Okazaki (JP); Keima Fukunaga, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/225,985

(22) Filed: Dec. 19, 2018

(65) Prior Publication Data
US 2019/0193620 A1 Jun. 27, 2019

(30) Foreign Application Priority Data
Dec. 26, 2017 (JP) .................................. 2017-249637

(51) Int. Cl.
*B60P 1/43* (2006.01)
*B62D 25/20* (2006.01)
*B60K 1/04* (2019.01)

(52) U.S. Cl.
CPC ................ *B60P 1/431* (2013.01); *B60K 1/04* (2013.01); *B60P 1/433* (2013.01); *B60P 1/436* (2013.01); *B62D 25/20* (2013.01); *B60K 2001/0438* (2013.01)

(58) Field of Classification Search
CPC ............ B60P 1/431; B60P 1/433; B60P 1/436
See application file for complete search history.

(56) References Cited

U.S. PATENT DOCUMENTS

| 5,160,236 A * | 11/1992 | Redding ................ A61G 3/061 14/71.1 |
| 5,636,399 A * | 6/1997 | Tremblay .............. A61G 3/061 14/71.1 |
| 5,676,515 A * | 10/1997 | Haustein ................. B60P 1/431 14/69.5 |
| 5,832,555 A * | 11/1998 | Saucier .................. A61G 3/061 14/71.1 |
| 6,238,168 B1 * | 5/2001 | Cohn ..................... A61G 3/061 414/537 |
| 6,264,416 B1 * | 7/2001 | Eaton, Jr. .............. B60P 1/431 14/71.1 |
| 7,052,227 B2 * | 5/2006 | Navarro ................. B60P 1/431 414/537 |

(Continued)

FOREIGN PATENT DOCUMENTS

| JP | H11115798 A | 4/1999 |
| JP | 2001-239888 A | 9/2001 |

(Continued)

*Primary Examiner* — Kaitlin S Joerger
(74) *Attorney, Agent, or Firm* — Dinsmore & Shohl LLP (57) ABSTRACT

An electric vehicle includes: a box-shaped base frame in which a battery is stored in an internal space, with a vehicle drive unit using an in-wheel motor attached to a side surface; and a floor panel that is separately arranged from the base frame at a position above the base frame in the vehicle. In the electric vehicle, a slope device that feeds out a slope board toward a sidewalk or a road is provided in a clearance between the base frame and the floor panel.

12 Claims, 9 Drawing Sheets

(56) References Cited

U.S. PATENT DOCUMENTS

| | | | | |
|---|---|---|---|---|
| 7,527,467 B2* | 5/2009 | Edwards | ............... | B60P 1/431 |
| | | | | 414/537 |
| 8,555,443 B2* | 10/2013 | Couto | ................... | A61G 3/061 |
| | | | | 14/71.1 |
| 9,126,522 B1* | 9/2015 | Perez | .................... | B60P 1/433 |
| 9,603,758 B1* | 3/2017 | Perez | .................... | B60P 1/433 |
| 2001/0005478 A1* | 6/2001 | Lewis | ................... | A61G 3/061 |
| | | | | 414/537 |
| 2003/0007853 A1* | 1/2003 | Cohn | ................... | A61G 3/061 |
| | | | | 414/537 |
| 2003/0044266 A1* | 3/2003 | Vandillen | .............. | A61G 3/061 |
| | | | | 414/537 |
| 2006/0245883 A1* | 11/2006 | Fontaine | ............... | A61G 3/061 |
| | | | | 414/537 |
| 2014/0377046 A1* | 12/2014 | Aiello | ................... | B60P 1/431 |
| | | | | 414/537 |
| 2015/0052693 A1* | 2/2015 | Allen | .................... | A61G 3/061 |
| | | | | 14/71.1 |
| 2016/0095767 A1* | 4/2016 | Smith | ................... | A61G 3/061 |
| | | | | 414/537 |
| 2016/0152170 A1* | 6/2016 | Kiyak | ................... | A61G 3/061 |
| | | | | 414/522 |
| 2018/0339635 A1* | 11/2018 | Stevens | ..................... | B60P 1/43 |
| 2019/0193620 A1* | 6/2019 | Matsuoka | ............... | B60P 1/431 |

FOREIGN PATENT DOCUMENTS

| JP | 2002-186119 A | 6/2002 |
|---|---|---|
| JP | 2002187577 A | 7/2002 |
| JP | 2012176751 A | 9/2012 |

\* cited by examiner

FIG. 9

ELECTRICALLY-DRIVEN VEHICLE

CROSS REFERENCE TO RELATED APPLICATION

This application claims priority to Japanese Patent Application No. 2017-249637 filed on Dec. 26, 2017, which is incorporated herein by reference m its entirety including, the specification, claims, drawings, and abstract.

TECHNICAL FIELD

The present disclosure relates to a structure of an electrically-driven vehicle to which a slope device is attached.

BACKGROUND

An eight-wheel drive electric vehicle has been proposed. The eight-wheel drive electric vehicle has wheel pairs arranged at four corners of a vehicle body and has a full-flat vehicle cabin floor. Each of the wheel pairs includes two wheels, each of which has an incorporated in-wheel motor, and which are aligned in an advancing direction of the vehicle. In the electric vehicle, a drive unit is attached, via a suspension, to a side surface of a battery built-in frame, in which a battery is mounted under the floor. The drive unit uses each of the in-wheel motors (for example, see JP 2002-186119 A).

In addition, in order to facilitate getting-on/off of a bus by a wheelchair user, a structure of storing a slope device under steps at an entrance of the bus has been proposed (for example, see JP 2001-239888 A).

SUMMARY

Technical Problem

Incidentally, the electric vehicle, in which the drive unit using the in-wheel motors is attached to the side surface of the frame, has an advantage that floor height can be lowered, in addition to the advantage that the vehicle cabin floor can be full-flat. Thus, such an electric vehicle is suited not only for passenger use but also for loading of articles on a pallet onto the floor for shipment. However, the electric vehicle disclosed in JP 2002-186119 A has a problem that a storage space for the slope device as disclosed in JP 2001-239888 A is not provided and thus the electric vehicle is unsuited for shipment of articles, and the like.

In view of the above, the present disclosure has a purpose of providing an electrically-driven vehicle on which a slope device is mounted.

Solution to Problem

An electrically-driven vehicle according to the present disclosure is an electrically-driven vehicle that includes: a box-shaped base frame in which a battery is stored in an internal space and a vehicle drive unit using an in-wheel motor is attached to a side surface; and a floor panel that is separately arranged from the base frame at a position above the base frame in the vehicle. In the electrically-driven vehicle, a slope device that feeds out a slope board toward a sidewalk or a road is provided in a clearance between the base frame and the floor panel.

As described above, the floor panel and the base frame are arranged with the clearance being, provided therebetween. Thus, the slope device can be mounted in the clearance. In addition, it is possible to prevent heat of the battery from being transferred to the floor panel.

In the electrically-driven vehicle according to the present disclosure, the slope device may include: an actuator that feeds the slope board in and out; and a control unit that regulates an operation of the actuator. The control unit may adjust feed-out length or a feed-out angle on the basis of a height difference and a distance between a surface of the sidewalk or the road and the floor panel.

In this way, loading/unloading of an article or getting on and off of the vehicle with a wheelchair or the like can be performed smoothly.

The electrically-driven vehicle according to the present disclosure may further include: a body that is provided above the base frame in the vehicle and constitutes a vehicle cabin with the floor panel; and a door that is arranged on a side surface of the body. The control unit of the slope device may feed out the slope board to an outer side in a vehicle width direction by using the actuator when the door is opened.

The door is opened/closed in an interlocking manner by feeding the slope board in and out. Thus, loading/unloading of the article or getting on and off of the vehicle with the wheelchair or the like can be performed further smoothly.

In the electrically-driven vehicle according to the present disclosure, the floor panel may be provided above the base frame in the vehicle via a buffer member.

In this way, it is possible to prevent vibrations of a floor of the vehicle cabin.

The present disclosure can provide the electrically-driven vehicle on which the slope device is mounted.

BRIEF DESCRIPTION OF DRAWINGS

Embodiment(s) of the present disclosure will be described based on the following figures, wherein.

DESCRIPTION OF EMBODIMENTS

Figure 1:
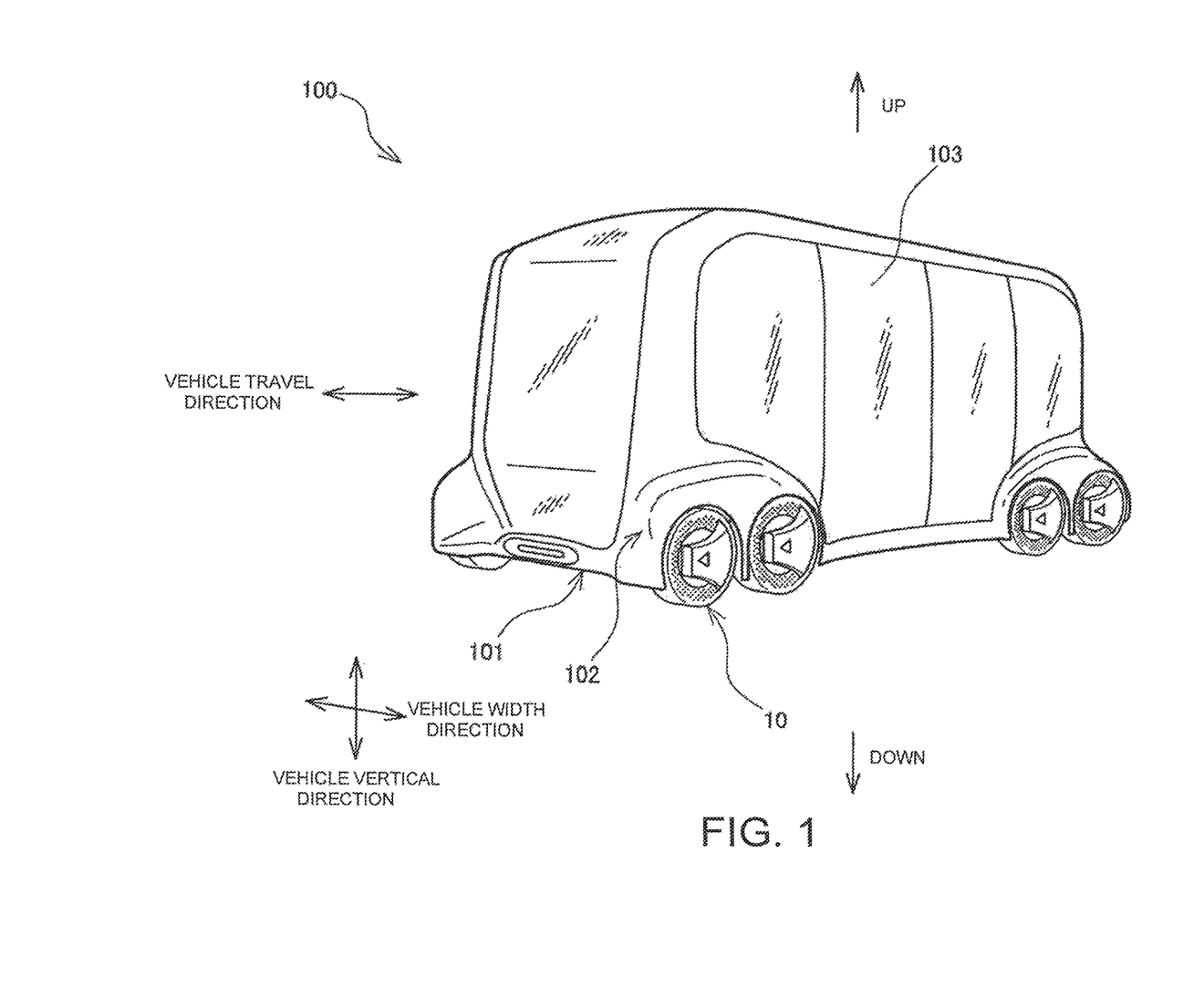
FIG. 1 is a perspective view of an electric vehicle in an embodiment.
Figure 2:
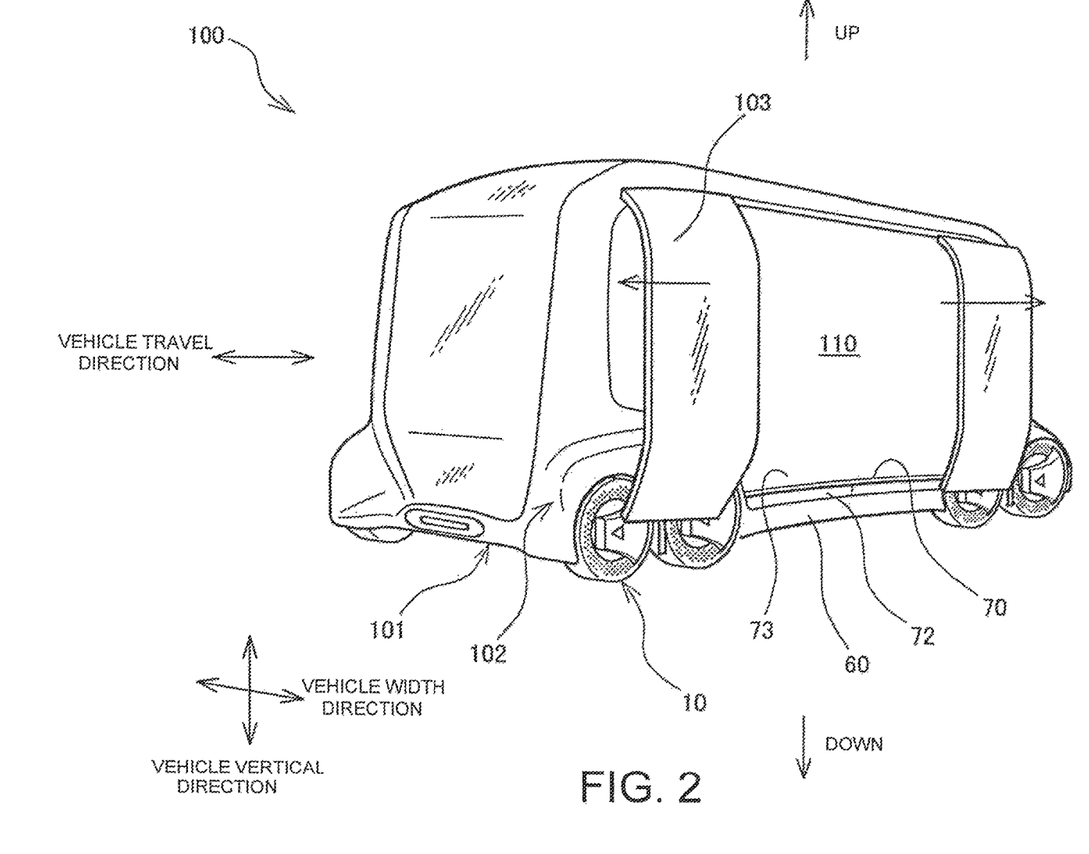
FIG. 2 is a perspective view of a state where doors of the electric vehicle illustrated in FIG. 1 are opened.
Figure 3:
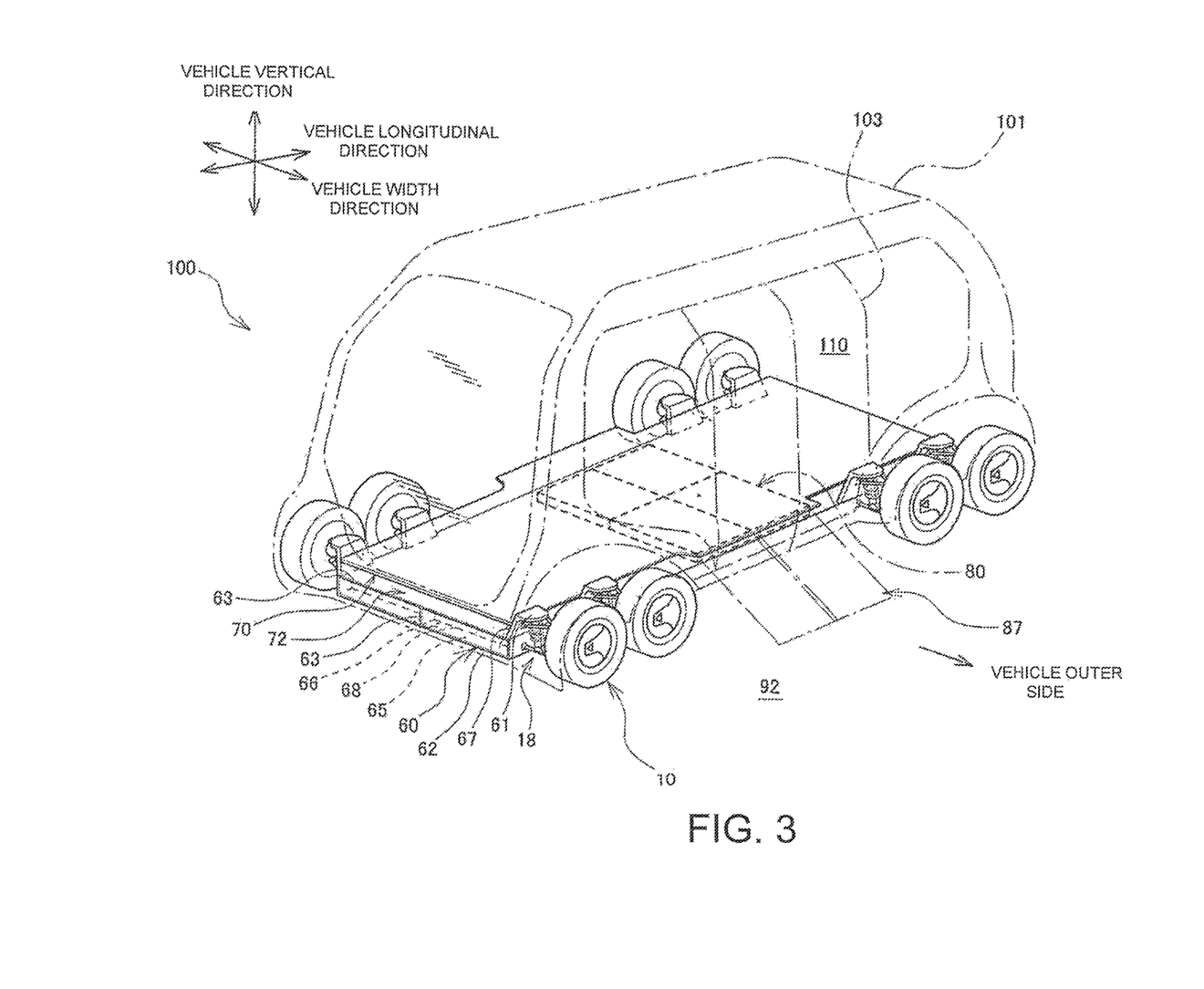
FIG. 3 is a perspective view of a state where a vehicle drive unit, a floor panel, and a slope device are attached to a base frame of the electric vehicle in the embodiment.
Figure 4:
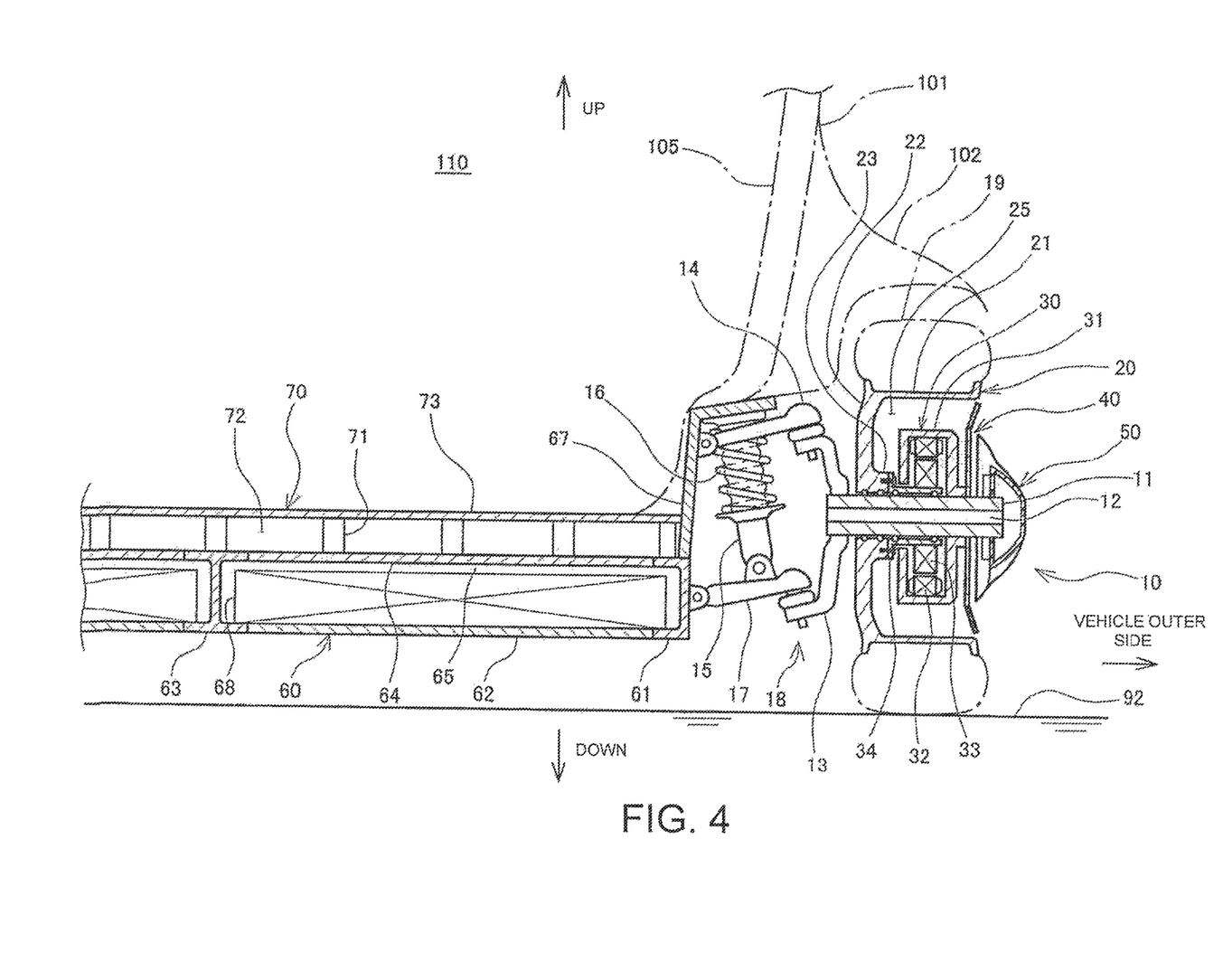
FIG. 4 is a cross-sectional elevation view of the vehicle drive unit, the base, frame, and the floor panel in a plane that includes center axis of the vehicle drive unit of the electric vehicle in the embodiment.

A description will hereinafter be given of an electric vehicle 100 of an embodiment, with reference to the drawings. As illustrated in FIG. 1, the electric vehicle 100 as an electrically-driven vehicle is an eight-wheel drive vehicle in which two vehicle drive units 10, each of which has an incorporated in-wheel motor 30 illustrated in FIG. 4, are aligned in an advancing direction and arranged in a bulged section 102 at each of four corners of a body 101. A shape of the body 101 is longitudinally symmetrical. The electric vehicle 100 travels by automatic driving and can travel either forward or backward. Slide-type doors 103 are provided on a side surface of the body 101. When the doors 103 are opened as illustrated in FIG. 2, a vehicle cabin 110 that includes a full-flat floor surface 73 can be seen as illustrated in FIG. 3. The electric vehicle 100 has the size of a minibus, for example. The electric vehicle 100 is used as a transportation vehicle for passengers or articles, or is used as a mobile shop or a mobile office using the vehicle cabin 110 as a shop or an office.

As illustrated in FIG. 3, the electric vehicle 100 has a base frame 60, the vehicle drive units 10, a floor panel 70, the body 101, the doors 103, and a slope device 80.

Figure 5:
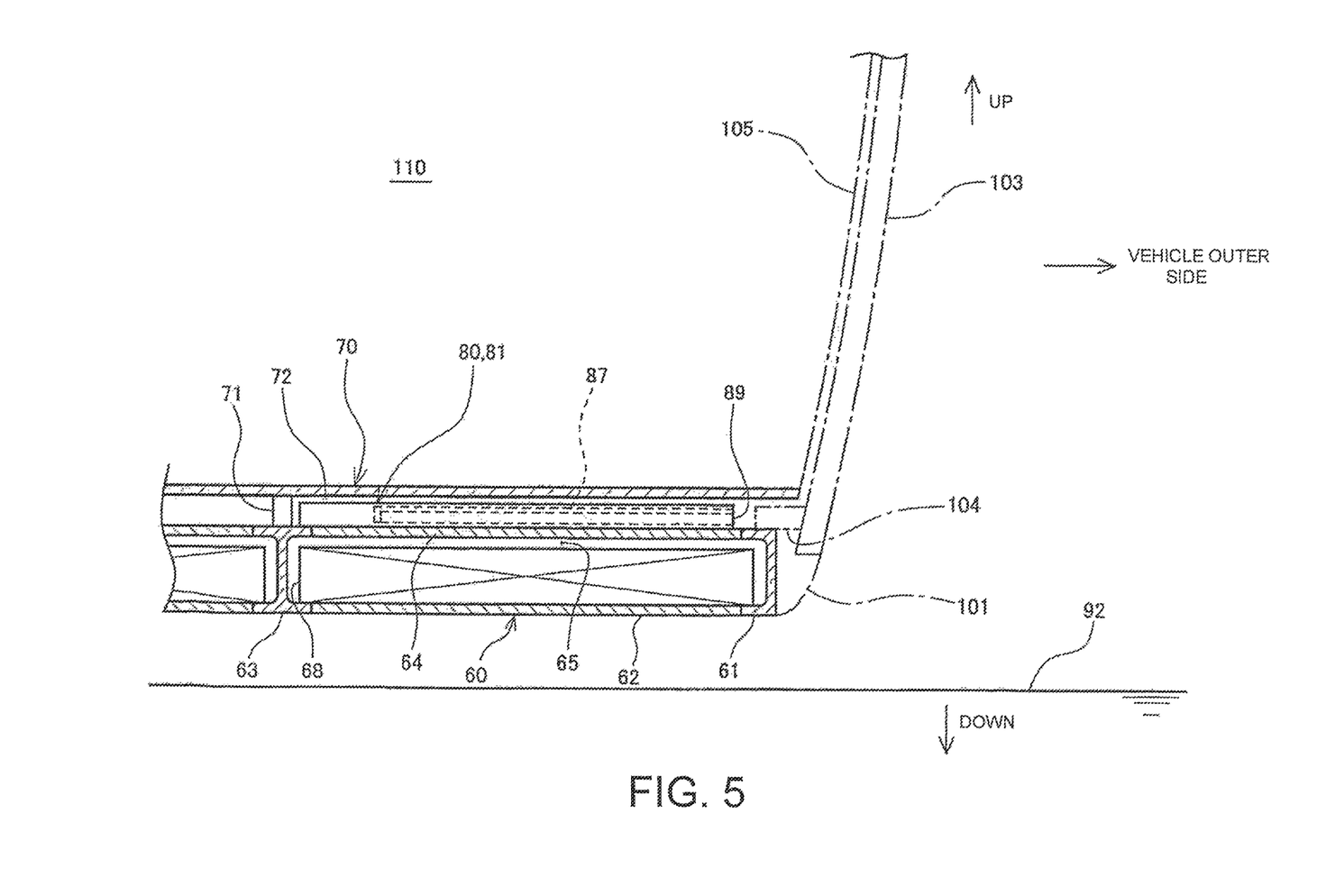
FIG. 5 is a cross-sectional elevation view of the slope device and cross sections of the base frame and the floor panel at the door of the electric vehicle in the embodiment.

As illustrated in FIG. 3 to FIG. 5, the base frame 60 is a box-shaped structure that is configured to include: a side member 61 that extends in a vehicle longitudinal direction on an outer side in a vehicle width direction; a center member 63 that extends in the vehicle longitudinal direction at a center in the vehicle width direction; a floorboard 62; a top board 64; and front and rear end boards 66. A battery 68 is stored in an internal space 65 of the base frame 60. In addition, as illustrated in FIG. 4, the vehicle drive unit 10 using the in-wheel motor 30 is attached to an outer side of the base frame 60 in the vehicle width direction via a suspension mechanism 18.

As illustrated in FIG. 4, the vehicle drive unit 10 includes: a wheel 20 that has a bottomed cylindrical shape and has an outer circumference to which a fire 19 is attached; the in-wheel motor 30 that is arranged in an internal space 25 of the wheel 20; an annular motor cover 40; and a wheel cover 50. The wheel 20 is rotatably attached to a circumference of a shaft 11, and the shaft is non-rotatably attached to the base frame 60 via the suspension mechanism 18. The in-wheel motor 30 and the motor cover 40 are fixed to the shaft 11, and the wheel cover 50 is turnably attached to the circumference of the shaft 11.

The suspension mechanism 18 can adopt any of various configurations. As one example of the configuration, as illustrated in FIG. 4, the suspension mechanism 18 may be configured to include: a steering knuckle arm 13 to which the shaft 11 is fixed; an upper arm 14 that is attached to an upper side of the steering knuckle arm 13 in a freely rotatable manner; a lower arm 17 that is attached to a lower side of the steering knuckle arm 13 in the freely rotatable manner; a shock absorber 15 that is rotatably connected to the lower arm 17; and a coil spring 16 that is provided between the shock absorber 15 and a suspension support 67 provided on the base frame 60. In this case, the upper arm 14 is rotatably attached to the suspension support 67, and the lower arm 17 is turnably attached to the side member 61 of the base frame 60.

The wheel 20 has a bottomed cylindrical shape and includes a cylindrical rim 21 and a disc 22. The tire 19 is attached to an outer surface of the rim 21. A hub 23 is provided at a center of the disc 22. The wheel 20 is attached to the circumference of the shaft 11 in such a manner that rotation thereof is allowed by a ball bearing. The in-wheel motor 30 is embedded in the internal space 25 of the wheel 20.

The in-wheel motor 30 is a motor that is driven by electricity of the battery 68 stored in the base frame 60, and includes a casing 31, a stator 32, a rotor 33, and an output shaft 34. The casing 31 is fixed to an outer circumference of the shaft 11, and the stator 32 is fixed to an inner surface of the casing 31. The output shaft 34 is arranged in the casing 31. The output shaft 34 is rotatably attached to the circumference of the shaft 11, and the rotor 33 is attached to an outer side of the output shaft 34. An inner side of the output shaft 34 in the vehicle width direction is fastened to the hub 23 of the wheel 20 via a flange.

The shaft 11 is provided with a center hole 12, and the electricity is supplied to the in-wheel motor 30 by an unillustrated feed cable that is routed from the center hole 12 of the shaft 11 to the casing 31.

As illustrated in FIG. 3 and FIG. 4, the floor panel 70 is provided above the base frame 60 in the vehicle via a rubber bush 71 as a buffer member. A clearance 72 is provided between a lower side of the floor panel 70 and an upper side of the top board 64 of the base frame 60. The floor surface 73, which is a surface of the floor panel 70 on the upper side of the vehicle, is flat.

As illustrated in FIG. 4 and FIG. 5, the body 101 is attached to the base frame 60 in a manner to extend upward from the base frame 60 in the vehicle. An interior trim 105 that constitutes a design surface of the vehicle cabin 110 is attached to a vehicle inner side of the body 101. The interior trim 105 and the floor surface 73 of the floor panel 70 constitute the design surfaces of the vehicle cabin 110. The slide-type door 103 is attached to the side surface of the body 101. The door 103 has: a slider that is guided by an unillustrated upper slide rail; and an arm 104 that is guided in the clearance 72 between the base frame 60 and the floor panel 70, and is opened/closed in the vehicle longitudinal direction along the upper slide rail and the clearance 72.

As illustrated in FIG. 3 and FIG. 5, the slope device 80 that feeds out a slope board 87 to the outer side in the vehicle width direction is provided in the clearance 72 between the base frame 60 and the floor panel 70. As illustrated in FIG. 3, the slope device 80 has the same width as the door 103 and half the length of the floor panel 70 in the vehicle width direction. A total of four slope devices 80, two in the vehicle width direction and two in the vehicle longitudinal direction, are provided.

Figure 6:
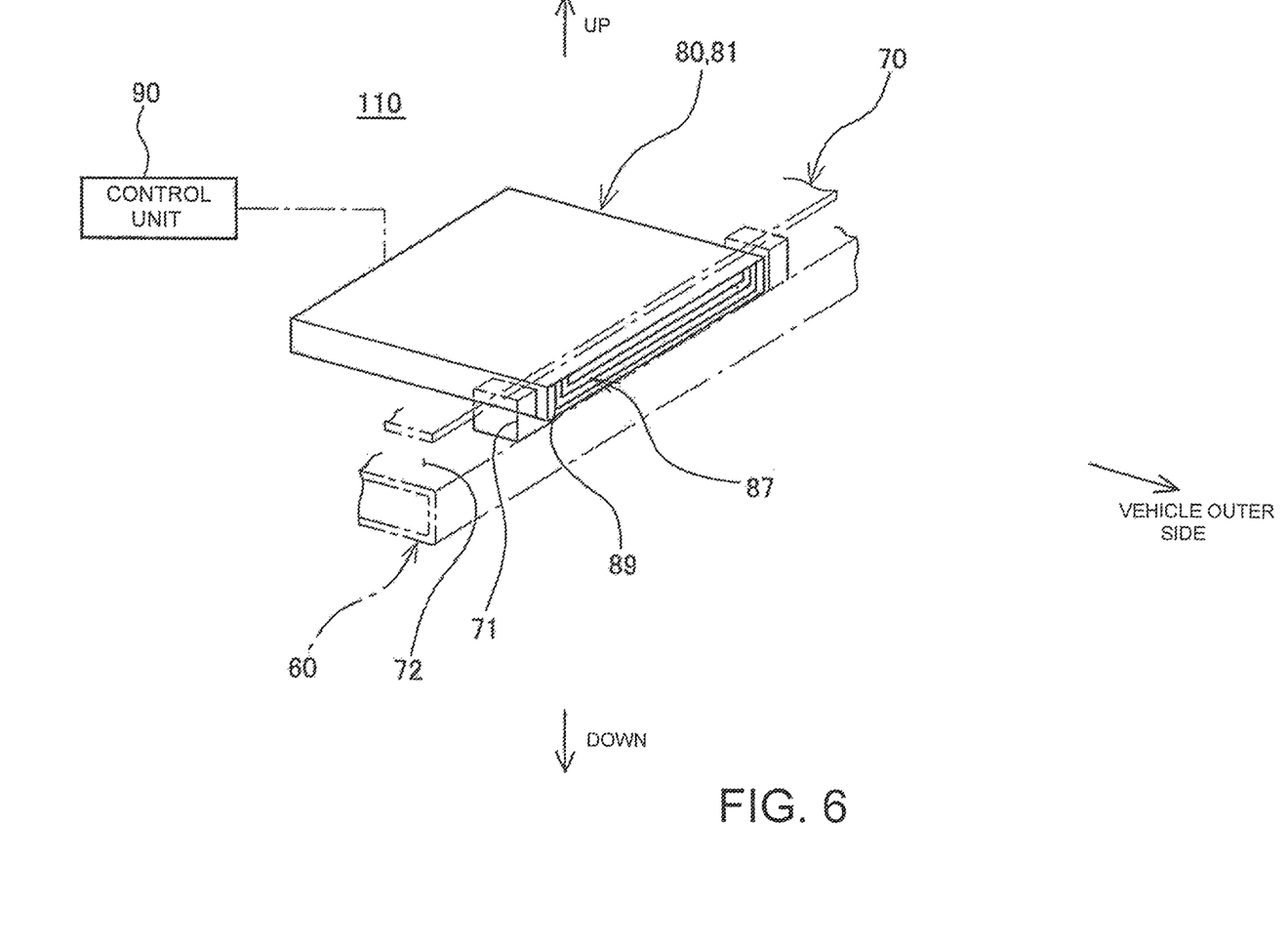
FIG. 6 is a perspective view of the slope device mounted on the electric vehicle in the embodiment.
Figure 7:
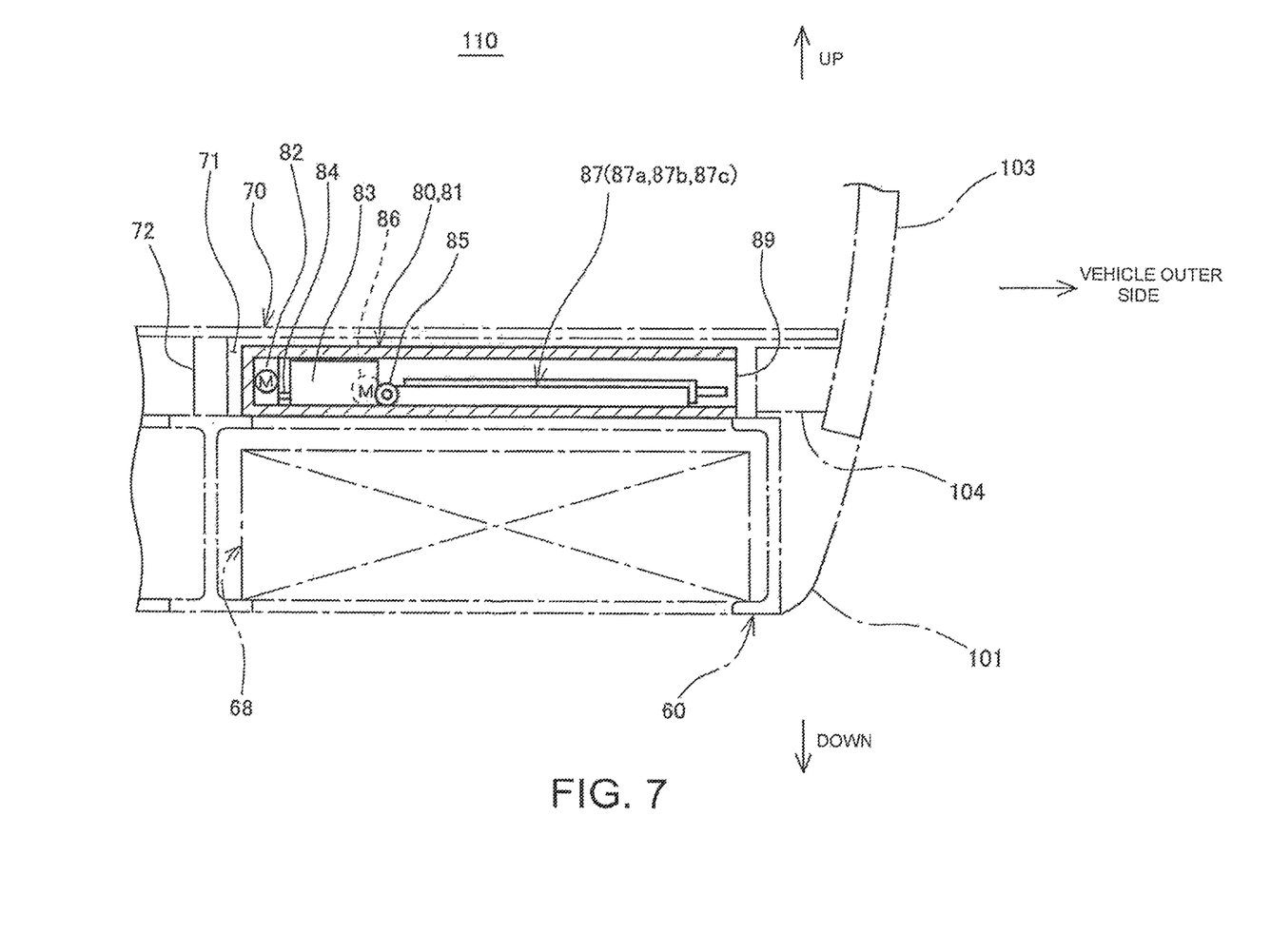
FIG. 7 is a cross-sectional view of the slope device in FIG. 6.

As illustrated in FIG. 6 and FIG. 7, the slope device 80 includes: a casing 81; a drive motor 82 that is attached to a base side as an opposite side of the casing 81 from an opening 89; a slide head 83 that slides in the casing 81; the slope board 87 that is attached to a tip side of the slide head 83 in the freely rotatable manner; a drive screw 84 that is driven by the drive motor 82 so as to move the slide head 83 between the base side and a tip side; and a control unit 90.

Figure 8:
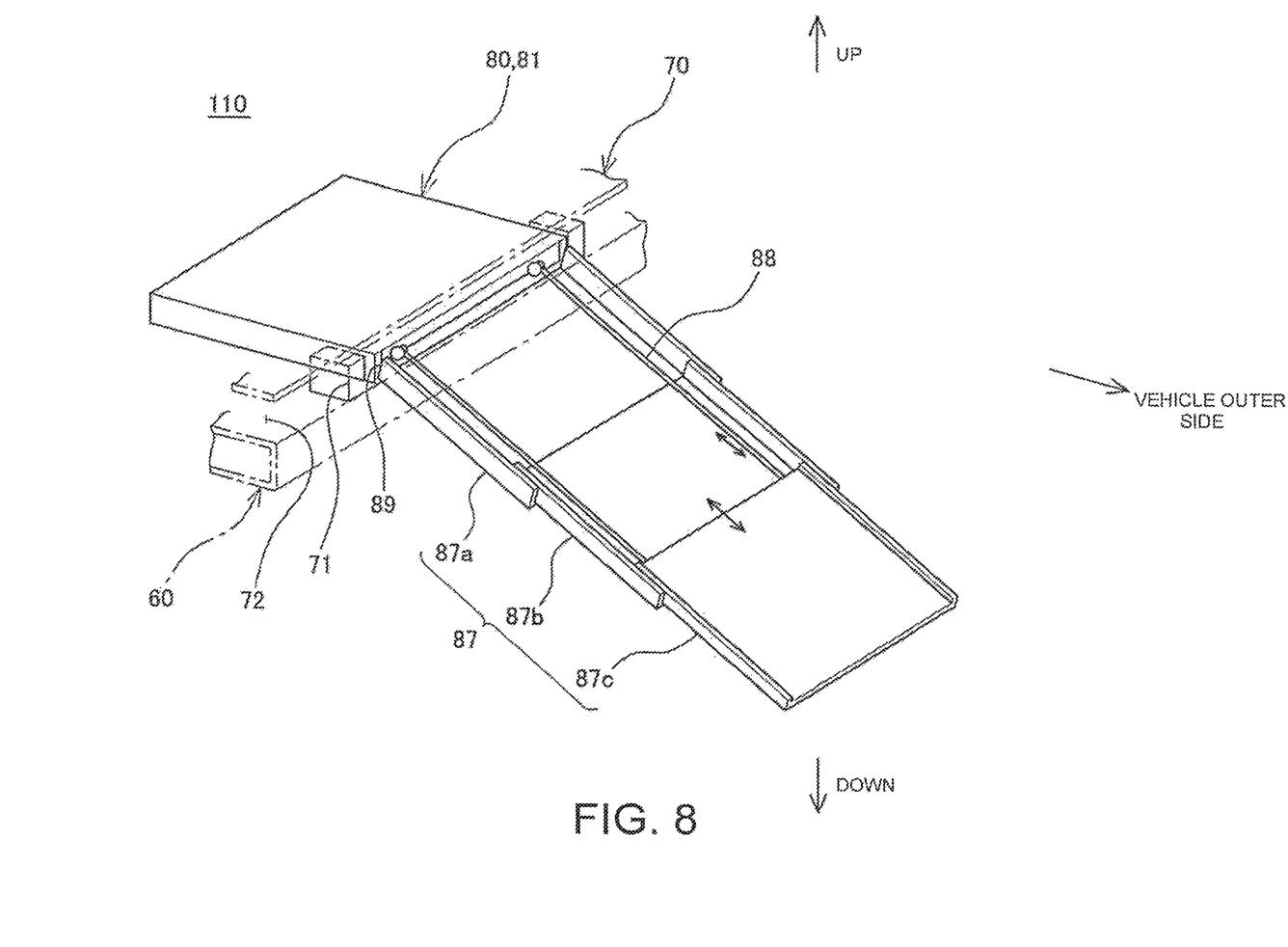
FIG. 8 is a perspective view of a state where the slope device in FIG. 6 feeds out a slope board.

As illustrated in FIG. 8, in the slope board 87, three boards of an outer board 87a, an inner board 87c, and at intermediate board 87b, each of which is folded in a groove shape, overlap each other in an order of the outer board 87a, the intermediate board 87b, and the inner board 87c from a lower side of the vehicle. The intermediate board 87b is guided by the outer board 87a, and the inner board 87c is guided by the intermediate board 87b. In this way, the outer board 87a, the intermediate board 87b, and the inner board 87c are fed out/in to/from the outer side in the vehicle width direction. The outer board 87a is connected to the slide head 83 via a rotation mechanism 85. The rotation mechanism 85 is rotationally driven by a motor mechanism 86 that is installed in the slide head 83. In addition, as illustrated in FIG. 8, feed-in/out wire 88 is connected to the motor mechanism 86 in the slide head 83, and is also connected to a base side of the inner board 87c.

The drive motor 82 and the motor mechanism 86 are connected to the control unit 90, and operations of the drive motor 82 and the motor mechanism 86 are regulated by the control unit 90. The drive motor 82, the drive screw 84, the motor mechanism 86, the rotation mechanism 85, and the wire 88 constitute an actuator that feeds the slope board 87 in and out.

A description will now be given on an operation of the slope device 80 that is configured as described so far. As illustrated in FIG. 1 and FIG. 7, in the case where the doors 103 of the body 101 are closed, the opening 89 of the slope device 80 is covered with the doors 103. Thus, the slope device 80 is not operated. As illustrated in FIG. 2, when the doors 103 slide and are opened, the clearance 72 between the floor panel 70 and the base frame 60 appears, and the opening 89 of the slope device 80 is uncovered.

Figure 9:
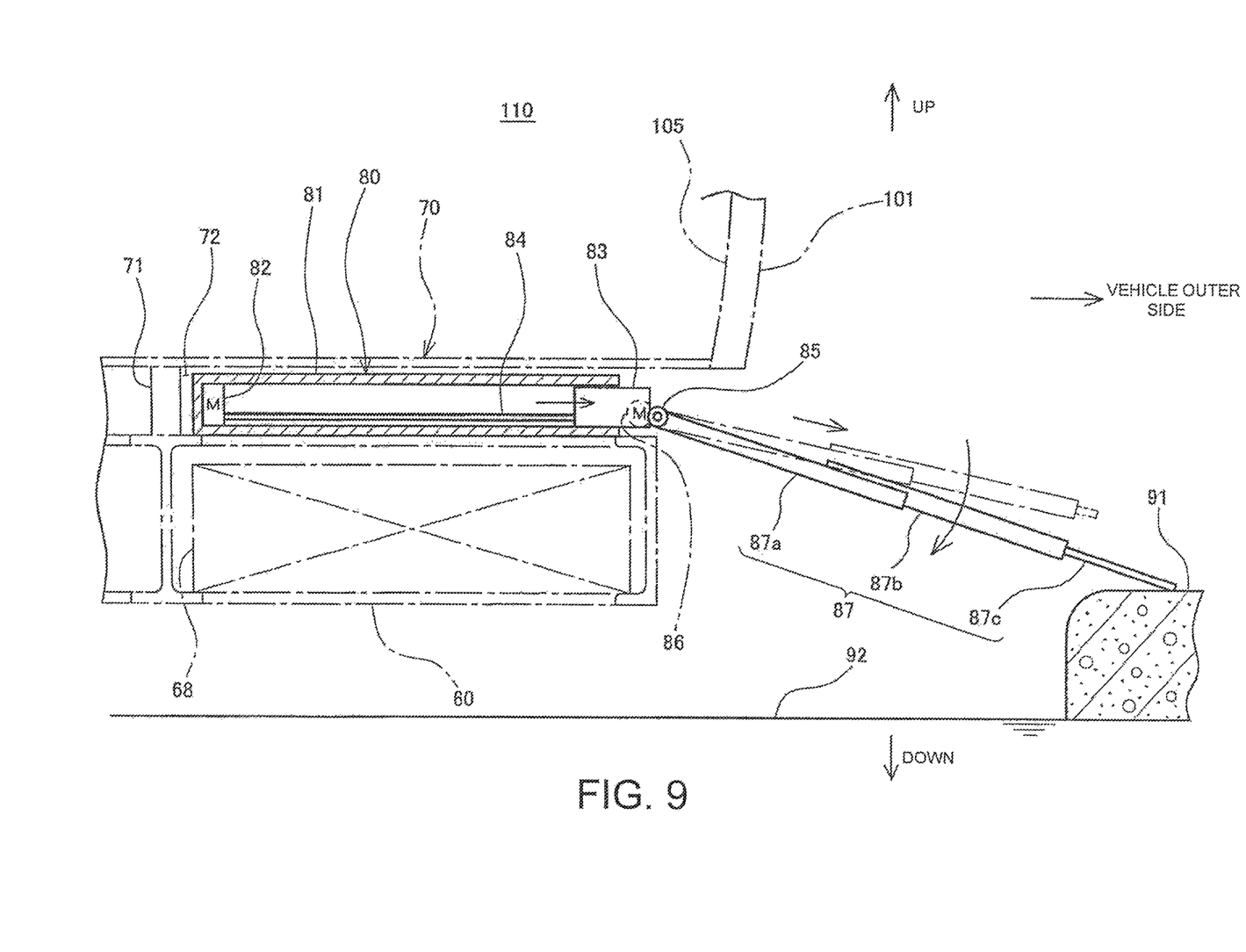
FIG. 9 is a cross-sectional view of the state where the slope device in FIG. 6 feeds out the slope board.

The control unit 90 uses an unillustrated camera or the like to check presence or absence of a sidewalk 91 (see FIG. 9) on the outer side of the door 103 and a height difference between a surface of a road 92 (see FIG. 9) or a surface of the sidewalk 91 and the floor surface 73 of the floor panel 70. Then, as illustrated in FIG. 9, the control unit 90 causes the drive screw 84 to rotate using the drive motor 82 so as to make the slide head 83 slide in a direction toward the opening 89. In this way, the slope board 87 is fed out from the opening 89 toward the outer side in the vehicle width direction. Once the rotation mechanism 85 of the slide head 83 is positioned outside of the opening 89, the control unit 90 drives the motor mechanism 86 to slant the slope board 87 downward.

In addition, the control unit 90 drives the motor mechanism 86 to feed out the wire 88, and feeds out the inner board 87c to the outside of the vehicle. Consequently, as illustrated in FIG. 9, the intermediate board 87b and the inner board 87c are fed out toward the outside of the vehicle, and the outer board 87a rotates downward. Then, when a tip of the inner board 87c comes in contact with the sidewalk 91, the control unit 90 stops the motor mechanism 86. In this way, a slope can be made ready for use.

The control unit 90 may adjust optimum feed-out length or an optimum feed-out angle on the basis of the height difference and a distance between the surface of the sidewalk 91 or the road 92 and the floor surface 73 of the floor panel 70. In addition, the slope boards 87 of the two slope devices 80 that are aligned in the longitudinal direction of the electric vehicle 100 may have different surface roughness, different patterns, or the like from each other. In this case, instead of simultaneously feeding out the slope boards 87 from the two slope devices 80, which are aligned in the longitudinal direction of the electric vehicle 100 as illustrated in FIG. 3, the control unit 90 may feed out the slightly corrugated slope board 87 of the slope device 80 when the article is loaded or unloaded, and the control unit 90 may feed out the corrugated anti-slip slope board 87 of the slope device 80 when an elderly person or the like walks on the slope board 87. As described, it may be possible to change size, surface corrugation, the surface roughness, or the like of the slope board 87 in accordance with a person or an object that passes the slope board 87.

In the electric vehicle 100 that has been described so far, the slope device 80 can be arranged in the clearance 72 between the floor panel 70 and the base frame 60. Thus, loading/unloading of the article or getting-on/off of the vehicle in a wheelchair can be performed smoothly. In addition, in the electric vehicle 100 of this embodiment, the floor panel 70 is provided above the base frame 60 in the vehicle via the rubber bush 71 as the buffer member. Thus, it is possible to prevent vibrations of the electric vehicle 100 from being transmitted to the inside of the vehicle cabin 110. Furthermore, since the clearance 72 is provided between the floor panel 70 and the base frame 60, it is possible to prevent heat of the battery 68 from being transferred to the floor panel 70.

The description has been given so far on, the case where, in the electric vehicle 100 of the embodiment, the slope board 87 is fed out to the outer side in the vehicle width direction. However, the electric vehicle 100 is not limited thereto, and the slope board 87 may be fed out in the vehicle longitudinal direction. In the case where the slope board 87 is fed out in the vehicle longitudinal direction, the slope board 87 may be fed out in an interlocking manner with opening of a front door or a rear door of the electric vehicle 100. In addition, the slope board 87 may be fed out manually without using the actuator.

The invention claimed is:

1. An electrically-driven vehicle comprising:
   a box-shaped base frame in which a battery is stored in an internal space, with a vehicle drive unit using a motor attached to a side surface thereof; and
   a floor panel that is mounted at a position above the base frame in the vehicle while forming a clearance with respect to the base, wherein
   a slope device that feeds out a slope board is provided in the clearance between the base frame and the floor panel.

2. The electrically-driven vehicle according to claim 1, wherein
   the slope device feeds out the slope board toward a sidewalk or a road, and the slope device includes: an actuator that feeds the slope board in and out; and a control unit that regulates operation of the actuator, and
   the control unit adjusts feed-out length or a feed-out angle on the basis of a height difference and a distance between a surface of the sidewalk or the road and the floor panel.

3. The electrically-driven vehicle according to claim 2, further comprising:
   a body that is provided above the base frame in the vehicle and constitutes a vehicle cabin with the floor panel; and
   a door that is arranged on a side surface of the body, wherein
   the control unit of the slope device feeds out the slope board to an outer side in a vehicle width direction by using the actuator when the door is opened.

4. The electrically-driven vehicle according to claim 1, wherein the floor panel is provided above the base frame in the vehicle via a buffer member.

5. The electrically-driven vehicle according to claim 2, wherein the floor panel is provided above the base frame in the vehicle via a buffer member.

6. The electrically-driven vehicle according to claim 3, wherein the floor panel is provided above the base frame in the vehicle via a buffer member.

7. The electrically-driven vehicle according to claim 1, wherein the motor is an in-wheel motor.

8. The electrically-driven vehicle according to claim 2, wherein the motor is an in-wheel motor.

9. The electrically-driven vehicle according to claim 3, wherein the motor is an in-wheel motor.

10. The electrically-driven vehicle according to claim 4, wherein the motor is an in-wheel motor.

11. The electrically-driven vehicle according to claim 5, wherein the motor is an in-wheel motor.

12. The electrically-driven vehicle according to claim 6, wherein the motor is an in-wheel motor.

* * * * *

UNITED STATES PATENT AND TRADEMARK OFFICE
CERTIFICATE OF CORRECTION

PATENT NO. : 10,493,893 B2
APPLICATION NO. : 16/225985
DATED : December 3, 2019
INVENTOR(S) : Tomohito Matsuoka et al.

It is certified that error appears in the above-identified patent and that said Letters Patent is hereby corrected as shown below:

In the Specification

In Column 1, Line 66, delete "being, provided" and insert --being provided--, therefor.

In Column 2, Line 46, delete "includes center axis" and insert --includes a center axis--, therefor.

In Column 3, Line 31, delete "fire 19" and insert --tire 19--, therefor.

In Column 4, Line 49, after "and", delete "at" and insert --an--, therefor.

In Column 6, Line 4, delete "on, the" and insert --on the--, therefor.

Signed and Sealed this
Fourth Day of February, 2020

Andrei Iancu
*Director of the United States Patent and Trademark Office*